United States Patent
Reddy (10) Patent No.: US 10,649,668 B2
(45) Date of Patent: *May 12, 2020

(54) SYSTEMS, METHODS, AND COMPUTER PROGRAM PRODUCTS PROVIDING READ ACCESS IN A STORAGE SYSTEM

(71) Applicant: NetApp Inc., Sunnyvale, CA (US)

(72) Inventor: Raghunatha Reddy, Bangalore (IN)

(73) Assignee: NetApp Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/902,425

(22) Filed: Feb. 22, 2018

(65) Prior Publication Data

US 2018/0181319 A1    Jun. 28, 2018

Related U.S. Application Data

(63) Continuation of application No. 13/464,473, filed on May 4, 2012, now Pat. No. 9,921,752.

(51) Int. Cl.
*G06F 12/00* (2006.01)
*G06F 3/06* (2006.01)
*G06F 11/20* (2006.01)

(52) U.S. Cl.
CPC ............ *G06F 3/0611* (2013.01); *G06F 3/065* (2013.01); *G06F 3/067* (2013.01); *G06F 3/0659* (2013.01); *G06F 11/2069* (2013.01); *G06F 11/2087* (2013.01)

(58) Field of Classification Search
CPC ...... G06F 3/0611; G06F 3/065; G06F 3/0659; G06F 3/067; G06F 11/2069; G06F 11/2087
See application file for complete search history.

(56) References Cited

U.S. PATENT DOCUMENTS

| 5,659,704 A | 8/1997 | Burkes et al. |
| 6,151,665 A | 11/2000 | Blumenau |
| 6,546,422 B1* | 4/2003 | Isoyama ............ H04L 67/02 707/999.01 |
| 7,467,265 B1 | 12/2008 | Tawri et al. |
| 7,613,751 B2 | 11/2009 | Tom et al. |

(Continued)

OTHER PUBLICATIONS

"Data ONTAP 8.1 Operating in Cluster-Mode: An Introduction," Sep. 2011, Charlotte Brooks, Technical Report, NetApp, Inc., TR-3982, 11 pages.

(Continued)

*Primary Examiner* — Prasith Thammavong
(74) *Attorney, Agent, or Firm* — Cooper Legal Group, LLC (57) ABSTRACT

A computer program product having a computer readable medium tangibly recording computer program logic for providing data access in a storage system, the computer program product including code to analyze a plurality of data access requests directed to a source volume of the storage system, code to generate a mirror volume of the source volume, the mirror volume including a subset of data items of the source volume, in which the first subset of data items is selected for the minor volume based at least in part on data access patterns revealed by analyzing the data access requests, and code to access the mirror volume in parallel with accessing the source volume to fulfill read requests from a plurality of hosts.

20 Claims, 4 Drawing Sheets

(56) References Cited

U.S. PATENT DOCUMENTS

| | | | |
|---|---|---|---|
| 7,805,511 B1 | 9/2010 | Panicker et al. | |
| 8,176,012 B1 | 5/2012 | Rabii et al. | |
| 8,924,425 B1 | 12/2014 | Pandey et al. | |
| 10,228,867 B2* | 3/2019 | Vervaet | G06F 11/1076 |
| 2002/0048269 A1* | 4/2002 | Hong | H04L 29/06 370/389 |
| 2003/0097417 A1* | 5/2003 | Lin | H04L 29/06 709/213 |
| 2004/0205380 A1* | 10/2004 | Black | G06F 3/0605 714/5.11 |
| 2004/0243704 A1* | 12/2004 | Botelho | G06F 16/958 709/224 |
| 2005/0193128 A1 | 9/2005 | Dawson et al. | |
| 2006/0015696 A1 | 1/2006 | Nguyen et al. | |
| 2006/0218365 A1 | 9/2006 | Osaki et al. | |
| 2006/0230099 A1* | 10/2006 | Maya | G06F 12/0866 709/201 |
| 2006/0235855 A1 | 10/2006 | Rousseau et al. | |
| 2007/0185925 A1 | 8/2007 | Prahlad et al. | |
| 2008/0275926 A1 | 11/2008 | Kitamura et al. | |
| 2009/0172323 A1 | 7/2009 | Swanson et al. | |
| 2009/0216985 A1 | 8/2009 | O'Connor et al. | |
| 2011/0225359 A1 | 9/2011 | Kulkarni et al. | |
| 2011/0225373 A1* | 9/2011 | Ito | G06F 12/0815 711/145 |
| 2012/0023154 A1* | 1/2012 | Demant | H04L 67/1097 709/203 |
| 2012/0054444 A1* | 3/2012 | Wang | G06F 16/27 711/133 |
| 2012/0226866 A1* | 9/2012 | Bozek | G06F 9/45558 711/122 |
| 2013/0259062 A1* | 10/2013 | Henning | H04L 67/2842 370/402 |
| 2014/0006465 A1* | 1/2014 | Davis | G06F 16/182 707/827 |
| 2016/0140015 A1* | 5/2016 | Baars | G06F 11/3608 717/132 |
| 2017/0060980 A1 | 3/2017 | Harris, Jr. et al. | |
| 2018/0212713 A1* | 7/2018 | Yu | H04L 1/0057 |
| 2019/0097754 A1* | 3/2019 | Yu | H04L 29/04 |

OTHER PUBLICATIONS

"FAS6200 Running Data ONTAP 8 Cluster Mode: Performance and Scalability," Chris Lemmons and Bhavik Desai, 2011, reprinted from the Internet at: https://community.netapp.com/t5/tkb/articleprintpage/tkb-id/tech-on-tap-articles/article-id/176, 4 pages.

Gridiron Systems, Key Features, 2010, printed from www.gridironsystems.com/products/key-features, 3 pages.

Gridiron Systems, "TurboCharger Overview," printed from www.gridironsystems.com/products/turbocharger on Mar. 21, 2012, 3 pages.

Netapp, Inc., "Data ONTAP 8.1 Cluster-Mode: Logical Storage Management Guide," Technical Report, Release Candidate Documentation, Aug. 25, 2011, 144 pages.

Non-Final Office Action cited in U.S. Appl. No. 13/464,473 dated Dec. 24, 2013, 29 pgs.

Reply Non-Final Office Action cited in U.S. Appl. No. 13/464,473 dated Apr. 23, 2014, 10 pgs.

Final Office Action cited in U.S. Appl. No. 13/464,473 dated Aug. 38, 2014, 54 pgs.

Reply Final Office Action cited in U.S. Appl. No. 13/464,473 dated Dec. 19, 2014, 9 pgs.

Non-Final Office Action cited in U.S. Appl. No. 13/464,473 dated Jan. 14, 2015, 41 pgs.

Reply Non-Final Office Action cited in U.S. Appl. No. 13/464,473 dated May 12, 2015, 9 pgs.

Non-Final Office Action cited in U.S. Appl. No. 13/464,473 dated Aug. 25, 2015, 21 pgs.

Reply Non-Final Office Action cited in U.S. Appl. No. 13/464,473 dated Nov. 25, 2015, 10 pgs.

Final Office Action cited in U.S. Appl. No. 13/464,473 dated Dec. 18, 2015, 24 pgs.

Reply Final Office Action cited in U.S. Appl. No. 13/464,473 dated Jan. 31, 2016, 10 pgs.

Advisory Action cited in U.S. Appl. No. 13/464,473 dated Feb. 26, 2016, 3 pgs.

Non-Final Office Action cited in U.S. Appl. No. 13/464,473 dated Apr. 11, 2016, 24 pgs.

Reply Non-Final Office Action cited in U.S. Appl. No. 13/464,473 dated Jul. 11, 2016, 9 pgs.

Final Office Action cited in U.S. Appl. No. 13/464,473 dated Feb. 10, 2017, 57 pgs.

Reply Final Office Action cited in U.S. Appl. No. 13/464,473 dated Apr. 7, 2017, 12 pgs.

Advisory Action cited in U.S. Appl. No. 13/464,473 dated Apr. 21, 2017, 3 pgs.

Notice of Allowance cited in U.S. Appl. No. 13/464,473 dated Nov. 3, 2017, 22 pgs.

\* cited by examiner

| 402 | 404 | 406 | 408 | 410 |
|---|---|---|---|---|
| READ/WRITE | ACCESSED | WHEN | SIZE OF REQUEST | BLOCK RANGE |
| READ | | XX:XX:XX | NN MB | YYYY-ZZZZ |

SYSTEMS, METHODS, AND COMPUTER PROGRAM PRODUCTS PROVIDING READ ACCESS IN A STORAGE SYSTEM

RELATED APPLICATIONS

This application claims priority to and is a continuation of U.S. application Ser. No. 13/464,473, filed on May 4, 2012, now allowed, titled "SYSTEMS, METHODS, AND COMPUTER PROGRAM PRODUCTS PROVIDING READ ACCESS IN A STORAGE SYSTEM," which is incorporated herein by reference.

TECHNICAL FIELD

The present description relates, in general, to read access operations in network storage systems and, more specifically, to techniques for making read access operations more efficient.

BACKGROUND

It is common for enterprises to use network storage systems, such as Storage Area Networks (SANs) and Network Attached Storage (NAS). One common arrangement is for an enterprise to use one or more Redundant Arrays of Independent Disks (RAIDs) to store data in a manner that is reliable and easy to access.

Such systems provide virtual storage volumes for access by host devices. For instance, a user at a computer (e.g., a host) may want to access a file stored to a network. The host computer sees a number of drives on the network, where the drives are provided by the storage system and may or may not correspond to physical disk drives. One or more storage controllers at the storage system organize the various storage resources (e.g., hard disk drives, solid state drives, etc.) into a number of virtual drives, where the complexity of virtualizing and managing the physical storage resources is not seen by the host.

Some network storage systems include many hosts accessing a number of virtual volumes provided by one or more storage controllers. A given volume may have only one or two paths for access, meaning that only one or two access requests may be made to the volume at a given time. In other words, a given volume may be limited in the number of accesses it can handle at any one time.

In order to make read access more efficient, some conventional systems provide for mirror volumes. Mirror volumes in this example include duplicates of the original (or source) volume, and the are accessible independently of the original volume. Thus, adding a single mirror volume may double the number of paths available to read the data held by the source volume. Similarly, adding two mirror volumes may triple the number of paths to access the same data.

Such conventional systems use processing resources to generate and update the mirror volumes. Furthermore, each minor volume takes up space on the physical storage resources. Therefore, it may be advantageous in some systems to generate smaller mirror volumes to save processing resources and available storage space in the storage system.

BRIEF DESCRIPTION OF THE DRAWINGS

The present disclosure is best understood from the following detailed description when read with the accompanying figures.

SUMMARY

Various embodiments include systems, methods, and computer program products providing read access in a network storage system. In one example, a system stores metadata from data access operations in a database. The system includes functionality to store the metadata over a period of time to create an historical record of read and write operations to the source volume. The system further includes functionality to analyze the metadata in the database to profile the data according to its access characteristics. The system then generates additional read volumes, which are accessible in parallel to the source volume. Each of the additional read volumes includes data from the source volume that is selectively copied based on its analyzed access characteristics while omitting other data from the source volume. Thus, the example provides for smaller and more efficient read volumes than does a conventional system that simply minors all or substantially all data from the source volume. In some examples, a storage controller for a storage array provides the functionality to store and analyze the metadata and to generate the additional read volumes.

One of the broader forms of the present disclosure involves a method for providing read access in a storage system, the storage system including a source volume with data stored thereto, the method including storing metadata from multiple access operations of the storage system in a database over time to create a record of the multiple access operations, analyzing the database to discern access characteristics of the data stored to the source volume to identify a first subset of data items of the source volume that have certain access characteristics different than that of other data items of the source volume, creating a read volume at the storage system in accordance with the analyzing, the read volume including the first subset of data and omitting at least some of the other items of data, and serving a data read request from a host via the read volume.

Another of the broader forms of the present disclosure involves a storage system including a plurality of physical storage devices, and a storage controller in communication with the physical storage devices to manage access to the physical storage devices and to provide a source volume of data, the storage controller including logic to perform the following functions: creating a database with information regarding a plurality of data access operations of the storage system, analyzing the database to discern access patterns of data stored to the source volume, generating a mirror volume by selectively duplicating a first subset of data items from the source volume and omitting a second subset of data items from the source volume based on the access patterns, the mirror volume being accessible in parallel to the source volume; and sending a requested data item from the mirror volume to a requesting host in response to a data access request from the host.

Another of the broader forms of the present disclosure involves a computer program product having a computer readable medium tangibly recording computer program logic for providing read access in a storage system, the computer program product including code to analyze a plurality of data access requests directed to a source volume of the storage system, code to generate a mirror volume of the source volume, the mirror volume including a first subset of data items of the source volume, in which the first subset of data items is selected for the mirror volume based at least in part on data access patterns revealed by analyzing the data access requests, and code to access the mirror volume in parallel with accessing the source volume to fulfill read requests from a plurality of hosts.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

It is understood that various embodiments may be implemented in any kind of network environment. For example, some embodiments may be implemented in a TCP/IP network connecting multiple clients and multiple servers. Other embodiments may be implemented in more specialized environments, such as in a Network Attached Storage (NAS), a Storage Area Network (SAN), or any other network storage configuration. Various embodiments are not limited to any particular network architecture or purpose and may be adapted for use in a wide-ranging array of environments.

Various embodiments disclosed herein provide techniques to efficiently replicate source volume data onto other read volumes, such as load sharing mirror volumes. One embodiment includes additional functionality in a storage controller within a storage device, where the additional functionality provides a database that stores information describing data access operations. In this example, the database is referred to as the access database.

The storage controller uses the access database to capture storage requests in real time and gather statistical information about the requested data for each data access operation. Examples of information that can be gathered include whether an operation is a read operation or a write operation, how and when particular data is requested, whether particular requested data is small or large. Further in this example, the storage controller stores the access database within the source volume. The storage controller analyzes the access database for application data access behavior in order to sort the information in the database. The analyzing forms long-term metadata for application data access patterns over time.

Further in this example, the storage controller leverages the information in the access database to create more efficient read volumes. The storage controller sorts and structures the information in the access database in order to identify items of data that should be selected for replication in the additional read volumes. Examples of data that may be selected include frequently accessed items and other data items which are likely to satisfy a near future data request. Other data may be omitted from the additional read volumes. In some examples, the data is selected in such a way that nearly all read requests can be served from the additional read volumes. The storage controller selectively duplicates some of the source volume data on to the additional read volumes (e.g., load sharing volumes) to serve read-intensive application data needs. The additional read volumes effectively form on-device read-ahead cache in some embodiments.

Some storage operating systems, such as Data Ontap™, available from NetApp, Inc., include mechanisms for generating and accessing these additional read volumes to serve read requests in parallel with the source volume. The functionality described above, to generate efficient read volumes, may be added to existing functionality in storage operating systems, often without hardware changes.

Since such embodiments provide data mirroring using resources of the storage system, they may be used instead of external hardware cache appliances. However, the scope of embodiments does not entirely exclude the possibility that external caching appliances may be used. Such embodiments that build on current storage operating system features may add value to the storage operating system and co-exist well with other operating system features.

Figure 2:
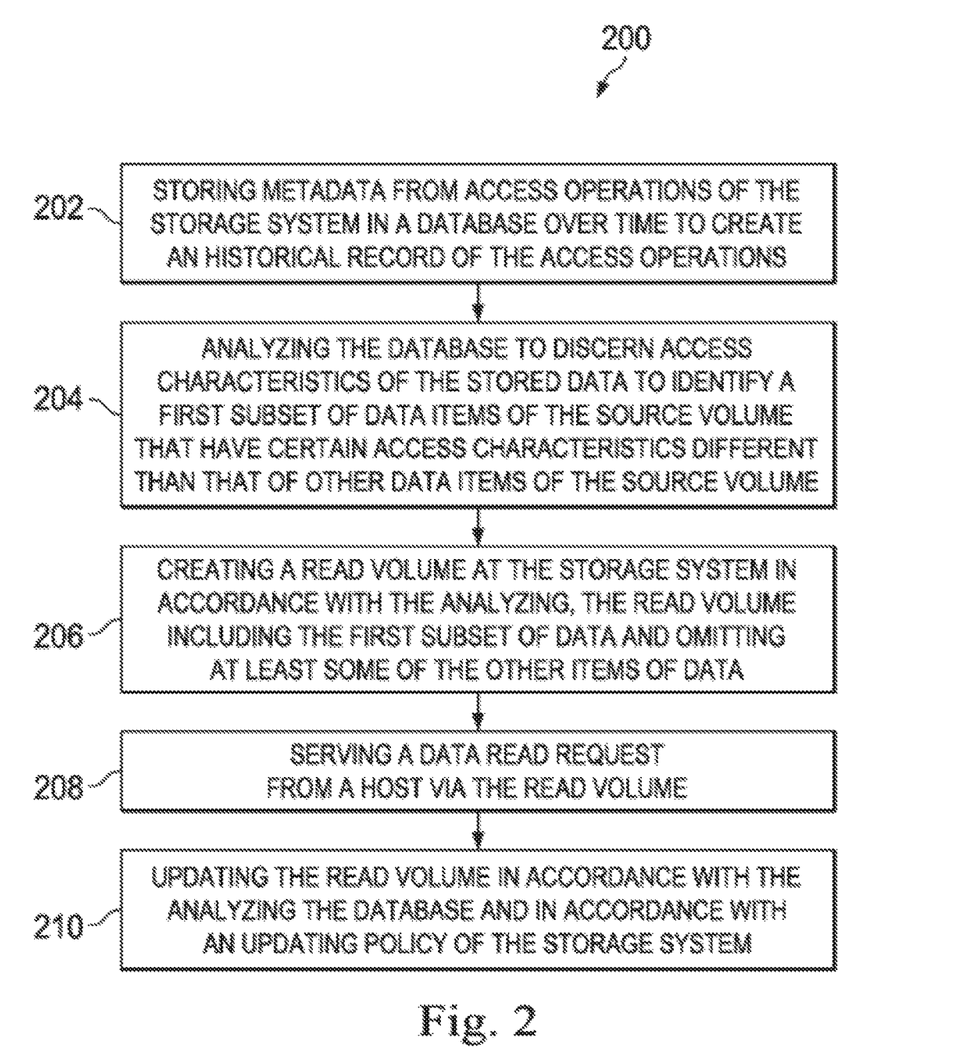
FIG. 2 is an illustration of an example method for efficiently generating, using, and updating an additional read volume according to one embodiment.

The example discussed above is described in more detail with respect to the flow chart of FIG. 2. The above described example is intended to be non-limiting. For instance, various embodiments are not limited to any one particular storage operating system, or to block-level analysis, or to any particular data access information in the access database.

Figure 1:
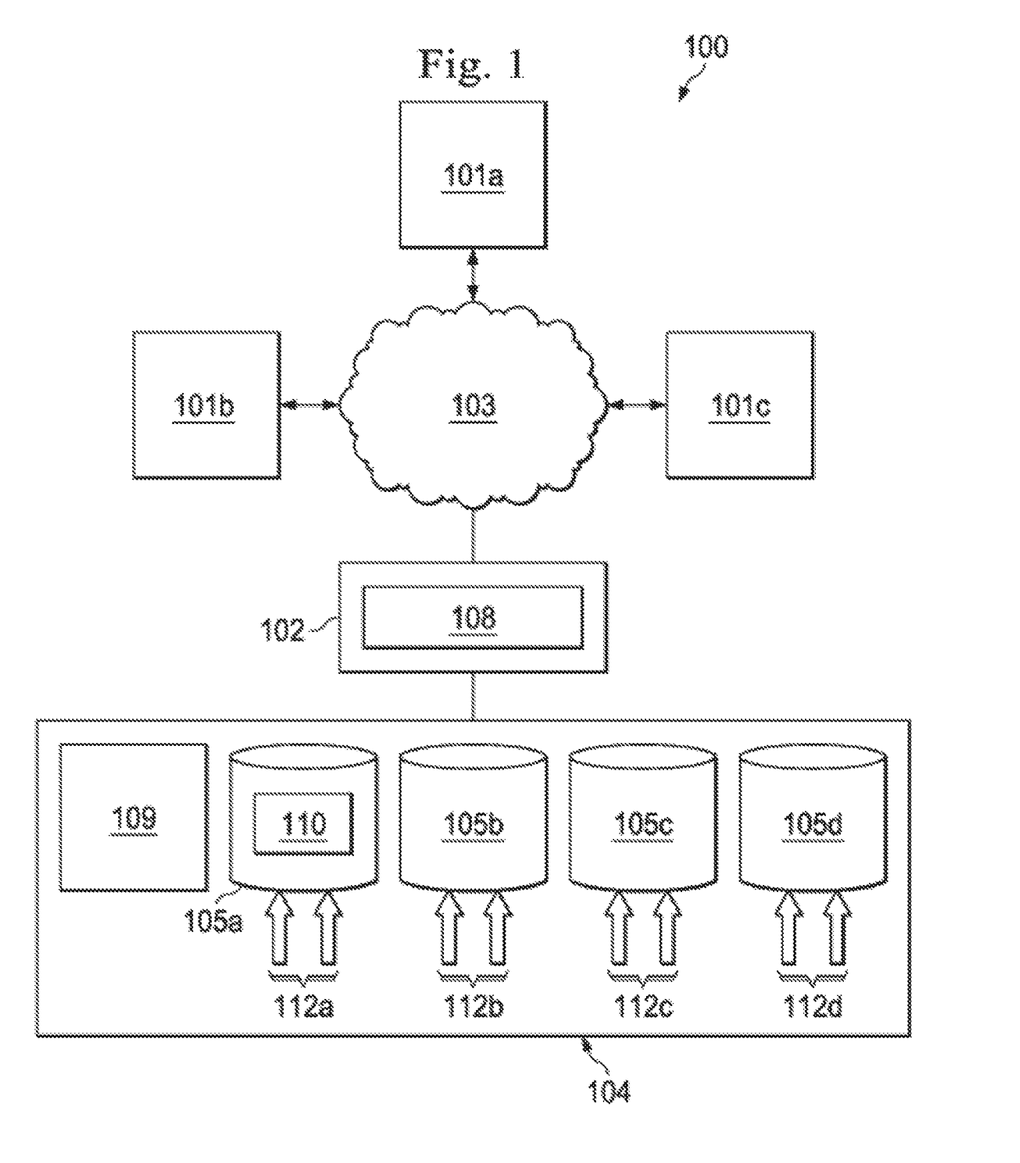
FIG. 1 is an illustration of an example network storage system that may implement various techniques according to the embodiments disclosed herein.

FIG. 1 is an illustration of an example network storage system 100 implementing a storage operating system 108 in which various embodiments may be implemented. Storage server 102 is coupled to a set of clients 101 through a network 103. The network 103 may include, for example, a local area network (LAN), wide area network (WAN), the Internet, a Fibre Channel fabric, or any combination of such interconnects. The server 102 and the storage subsystem 104 may be connected to a common communication and data transfer infrastructure, such as Fibre Channel or Ethernet, and may collectively comprise a SAN or a NAS.

Each of the clients 101 may include, for example, a personal computer (PC), server computer, a workstation, handheld computing/communication device or tablet, and/or the like. FIG. 1 shows three clients 101a-c, but the scope of embodiments can include any appropriate number of clients.

One or more of clients 101 may act as a management station in some embodiments. Such client may include management application software that is used by a network administrator to configure storage server 102, to provision storage in storage subsystem 104, and to perform other management functions related to the storage network, such as scheduling backups, setting user access rights, and the like.

The storage server 102 manages the storage of data in the storage subsystem 104. The storage server 102 handles read and write requests from the clients 101, where the requests are directed to data stored in, or to be stored in, storage subsystem 104. Storage subsystem 104 is not limited to any particular storage technology and can use any storage technology now known or later developed. For example, storage subsystem 104 has a number of nonvolatile mass storage devices (not shown), which may include conventional magnetic or optical disks or tape drives, non-volatile solid-state memory, such as flash memory, or any combination thereof.

In one particular example, the storage subsystem 104 may include one or more Redundant Array of Independent Disks (RAIDs).

Storage subsystem 104 includes storage controller 109, which manages the physical storage devices by providing virtualization. In this example, virtualization includes presenting an interface to one or more virtual volumes, each of which may not necessarily correspond to a particular physical storage device. The details of the physical media are hidden from the clients 101 so that the clients 101 "see" a virtual volume rather than the actual physical media. In this embodiment, storage subsystem 104 includes virtual volumes represented here by volumes 105a-d.

Further in this example, virtual volume 105a is a source volume and has read and write capability. Virtual volumes 105b-d are read-only load sharing mirror volumes that are provided by storage controller 109 in order to increase the total number of access paths 112 to the source volume data. Virtual volumes 105b-d include selected data items from the source volume 105a, as explained in more detail below in FIGS. 2-4.

In the embodiment of FIG. 1, each of the volumes 105 has two access paths 112, shown as arrows. Two access paths 112 for each volume 105 indicates that two independent read operations may be performed concurrently on each volume 105, and the addition of mirror volumes 105b-d provides capability to handle more concurrent read/write operations. In some examples, clients 101 are not aware of the mirror volumes 105b-d, but merely take advantage of the increased access resources provided by the mirror volumes 105b-d. Two access paths per volume is merely an example, as other embodiments may include any appropriate number of access paths.

The storage server 102 may allow data access according to any appropriate protocol or storage environment configuration. In one example, storage server 102 provides file-level data access services to clients 101, as is conventionally performed in a NAS environment. In another example, storage server 102 provides block-level data access services, as is conventionally performed in a SAN environment. In yet another example, storage server 102 provides both file-level and block-level data access services to clients 101.

The storage operating system 108 runs on server 102, and storage controller 109 includes specialized hardware and/or software that is compatible with the storage operating system 108 to accomplish virtualization and mirroring. Storage controller 109 in this example stores access database 110 to source volume 105a, updates access database 110 as new access operations are performed, and analyzes access database 110 in order to selectively duplicate data items from the source volume 105a to the load sharing mirror volumes 105b-d.

System 100 is shown as an example only. Other types of hardware and software configurations may be adapted for use according to the features described herein. For instance, various embodiments may include a different number of clients 101, a different number of load sharing mirror volumes 105b-d, and/or the like. In fact, any appropriate configuration may be used in various embodiments.

FIG. 2 is an illustration of exemplary method 200 adapted according to one embodiment. Method 200 may be performed by storage controller 109 (FIG. 1) to selectively duplicate source volume data onto additional read volumes and to serve read requests from the additional read volumes.

Figure 3:
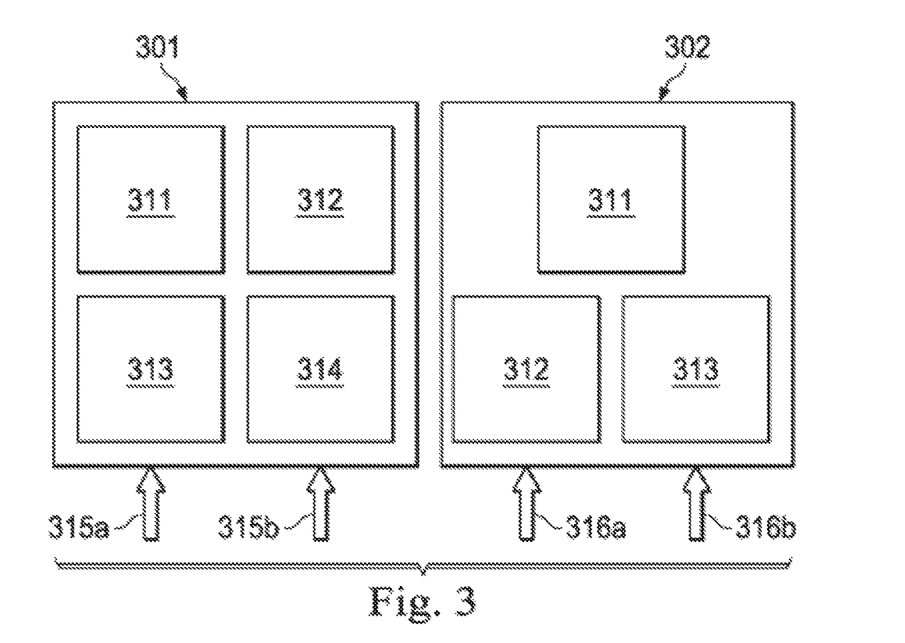
FIG. 3 is an example of a relationship between a source volume and an additional read volume, adapted according to the method of FIG. 2.

Moreover, FIG. 3 is an illustration of an example relationship between a source volume 301 and one additional read volume 302 according to one embodiment. FIG. 3 is provided to further illustrate the principles of FIG. 2, and it is exemplary only. It is understood that various embodiments may include any appropriate number of additional read volumes, where a single additional read volume 302 is provided herein for ease of illustration.

Figure 4:
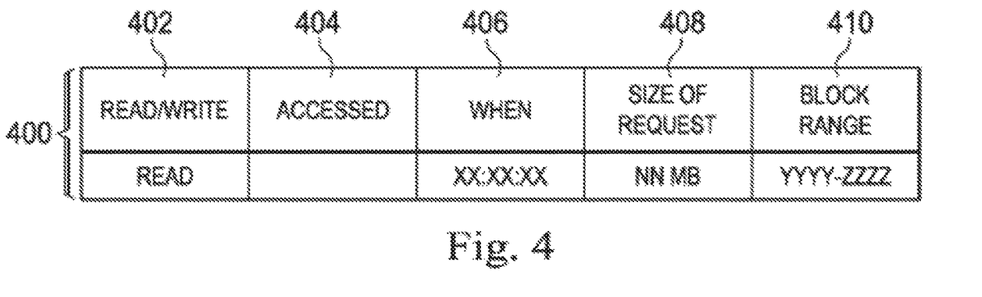
FIG. 4 is an illustration of an example entry in an access database according to the embodiment of FIG. 2.

FIG. 4 is provided to show an example database entry of the access database 110 (FIG. 1). It is understood that the scope of embodiments includes database entries of any appropriate size or makeup to track historical information about access operations.

Returning to FIG. 2, in action 202 the storage controller stores metadata from access operations of the storage system in a database over time to create an historical record of the access operations. The metadata include data about data—therefore, rather than including the accessed data of a read/write operation itself, the access database includes information about the data access operation. Each entry of the database may include information about a specific read/write operation that was performed in the storage system. As time goes on, and as more read/write operations are performed by the storage system, the access database grows. Typically, the more entries in the access database, the more robust the analysis can be. However, some embodiments may include a size-limited database so that the oldest entries are deleted to make room for newer entries. Any appropriate method to maintain the access database is within the scope of embodiments.

FIG. 4 shows an example database entry 400 according to one embodiment. For instance, the access database of method 200 may include multiple entries similar to that shown in FIG. 4 in order to keep an historical record of data access operations.

Entry 400 in this example includes the following fields. Field 402 is a field that shows whether a data access operation is a read or a write operation. In some embodiments, the additional read volumes are read-only and are used to speed up read operations. In such embodiments, a read operation may be more indicative of data that should be selected for inclusion in a read volume, whereas a write operation may be neutral or weigh against inclusion in the read volume.

Field 404 shows how the data is accessed. For instance, the field 404 may include a pointer for a portion of a storage area which gets accessed most often by read operations.

Field 406 shows when the data is accessed using a time stamp. Multiple entries for the same data item can indicate a frequency at which the data is accessed, especially in light of the time information. Specifically, entries in the access database for the same data item can be sorted by time, and the time information can provide an indication of access frequency. Generally, a higher frequency of data access for a particular data item weighs in favor of inclusion in a read volume. Field 406 also provides an indication of how recently a data item has been accessed. A more recent read request typically weighs in favor of copying the data item to a read volume.

Field 408 provides an indication of a size of a request in kilobytes or megabytes. Typically, a larger size for a read request weighs in favor of including the particular data item in a read volume because larger requests may take more time to fulfill. Thus, in order to keep from tying up a path to a source volume, data items associated with large read requests may be copied to a read volume.

Field 410 is an indication of a block range for the data access request. Requests with the same or similar block range may be directed to the same data item. The access database can be sorted by block range to group entries of the same data item together. The access database can be sorted according to any of the other fields as a secondary or tertiary criteria (e.g., by block range first 410, then by read/write 402 second, and time stamp 406 third so as to see how recently a data item was accessed).

The fields of entry 400 are exemplary only, as other embodiments may add, omit, rearrange, or modify any of the information in this example access database. In fact, any appropriate informational content aiding the disclosed concepts may be included in various embodiments.

Returning to FIG. 2, action 202 includes storing the access operation metadata in entries such as entry 400 (FIG. 4). In some embodiments the storage controller stores the access database to a reserved space in the source volume, though any appropriate storage location may be used. Action 204 includes analyzing the access database to discern access characteristics of the stored data. In one example, analyzing the access database includes sorting or otherwise manipulating the information in the database to reveal useful patterns about data access. In fact, useful information can be gleaned or otherwise derived in any appropriate manner.

The historical data of the access database, spanning perhaps hours, days, weeks, etc., provides information about how data is accessed, when particular data is accessed, how large access requests are, and any other appropriate access characteristic of the access requests. Logic in the storage controller analyzes the information in the access database to identify a first subset of data items that have certain access characteristics that make those data items appropriate candidates to be copied into additional read volumes.

As mentioned above, data items that are accessed more frequently and/or more recently are generally better candidates for inclusion in the additional read volumes because access to those data items can be expected to use more access resources in the storage system. However, frequency of access and how recently a data item has been accessed are not the only factors to be considered in some embodiments. For instance, size of access requests may also be considered since larger access requests tend to use more system resources than do smaller data access requests.

Analyzing the access database to discern the first subset of data items in action 204 may include any appropriate methodology to identify which data should be copied to a read volume and which data should be omitted from the read volume. For instance, some embodiments may use thresholds for access frequency, time since a last access, and/or data size to determine whether a data item should be copied to a read volume. Similarly, rather than rigid thresholds, other embodiments may use relative comparisons of any of the information to grab the most frequently accessed, most recently accessed, and largest data items while leaving a portion of the source volume data (e.g., 25%, 30% or the like) out of the first subset.

In fact, various embodiments may use any methodology, or combinations of methodologies, to discern a subset of data items for inclusion in a read volume. In some instances, the selection of data items for the first subset is based on a cost/benefit analysis of maximizing the amount of data on the source volume that can be accessed in parallel versus the competing concern of storage space that is occupied by the read volumes. Ideally, all of the data on the source volume would be accessible in parallel, though such an approach may waste storage space by copying data that is unlikely to be accessed. Various embodiments may use any methodology to balance these concerns using any appropriate information or criteria about data access operations.

In action 206, the storage controller creates a read volume at the storage system in accordance with the analyzing in action 204. The read volume includes the first subset of data and omits other data from the source volume so that only a portion of the data from the source volume is included in the read volume.

Some current storage operating systems already include functionality to create load sharing mirror volumes, where load sharing mirror volumes are a type of read volume that can be used in various embodiments. Load sharing mirror volumes are described above with respect to FIG. 1 and include read-only copies of the source volume and can be accessed independently from, and in parallel to, the source volume because the load sharing mirrors include their own access paths. The embodiment of FIG. 2 adds to those storage operating systems by selectively copying the first subset of data items to load sharing mirror volumes while not copying other data items. The embodiment of FIG. 2, therefore, creates smaller, more efficient load sharing minor volumes that have greater likelihood of being accessed and take less storage space in the storage system yet offer the same or nearly the same access-path-increasing performance of the traditional load sharing mirror approaches. However, the scope of embodiments is not limited to features added on to existing load sharing mirror technology. For instance, the concepts discussed above may be applied to any appropriate technique that mirrors or otherwise caches data. In one example, the concepts are applied to a file server cache, where the cache is treated as a primary tier and the original volume is treated as a secondary tier, in order to create the file server cache more efficiently.

FIG. 3 shows source volume 301 and read volume 302 to illustrate actions 204 and 206 (FIG. 2) according to one embodiment. Both source volume 301 and read volume 302 include independent access paths 315, 316, respectively. Thus, the data items on read volume 302 can be read independently of the data items on source volume 301. Therefore, multiple applications (e.g., running at client computers) may make read requests of the data items in parallel with respect to each other, taking advantage of the multiple read access paths 315, 316. In fact, multiple applications may read the same data concurrently, unaware of the storage system mechanisms that provide parallel access.

Action 204 may include identifying the first subset to include data items 311-313 as having certain access characteristics while data item 314 is identified as having different access characteristics. Thus, action 206 includes copying data items 311-313 to read volume 302 but omitting data item 314 from the copying. In some instances, data item 314 may be much less likely to be read-accessed than are the other data items 311-313, so that the example shown in FIG. 3 provides the same, or nearly the same, performance enhancement as a comparable embodiment that copies data items 311-314. In some embodiments, method 200 may include generating two or more (or any appropriate number) of additional read volumes.

Returning to FIG. 2, action 208 includes serving a data read request from a host (e.g., a client 101 of FIG. 1) via the read volume. In this example, the storage controller, upon receiving the read request, directs the request to the additional read volume rather than to the source volume. In one example, the storage controller may select the read volume rather than the source volume in an attempt to balance resource usage among the volumes. In another example, the storage controller may direct the read request to the read volume rather than to the source volume because the access paths of the source volume are reserved for write access or in use by other host applications. In any event, it is noted that the data items on the additional read volume are independently accessible with respect to the data items on the source volume.

Action 210 includes updating the read volume. Some conventional systems that provide load sharing mirrors include updating policies for the load sharing mirrors. In one aspect, when data is modified on the source volume, the old data on the load sharing mirrors is then considered "stale" and may or may not be useful. Thus, some conventional systems include policies for updating the data on the load sharing mirrors to minimize stale data while avoiding constant updates, which might slow operation of the system.

The example embodiment of FIG. 2 adds the further feature of selectively copying data from the source volume to the additional read volume. Therefore, action 210 includes updating the additional read volume in accordance with the storage operating system's policies as well as in accordance with analyzing the access database. In one aspect, action 210 includes repeating, in whole or in part, actions 204 and 206 to analyze the access database to identify data access patterns and then update the old read volume or generate a new read volume.

Method 200 of FIG. 2 is exemplary only, and the scope of embodiments is not limited to the exact configuration of method 200. Other embodiments may add, omit, rearrange, or modify one or more actions, as appropriate.

For instance, some embodiments may repeat action 208 more often than repeating the other actions of method 200 because in most embodiments there will be many more read requests than there are instances of generating or updating the read volumes.

Furthermore, various embodiments may store metadata in accordance with action 202 for each data access operation so that action 202 is periodically or continually performed. Similar to the discussion of action 208 (above), saving metadata of action 202 may occur more often than read volumes are generated or updated. With these features in mind, it is apparent that as a working system operates, it may not perform the actions of method 200 in the specific order of the example flowchart.

Various embodiments may include one or more advantages over other techniques. For instance, various embodiments provide a caching mechanism for read access operations using hardware already available in the storage system. Such approach is more advantageous than a caching system that is an add-on to a storage system because the above-described embodiments may be expected to be more compatible with the existing hardware and software. Additionally, various embodiments may be implemented in a system with load sharing mirrors by updating hardware and or firmware.

Furthermore, as mentioned above, various embodiments provide the same, or nearly the same, load sharing performance but with smaller read volumes. The smaller read volumes may occupy less storage space on the storage system, thereby freeing some storage space for use by other data.

When implemented via computer-executable instructions, various elements of embodiments of the present disclosure are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information. One or more processors at the storage server (e.g., server 102 of FIG. 1), the storage subsystems (e.g., subsystem 104, especially controller 109), or elsewhere in the network storage system may execute such instructions to provide one or more of the actions of method 200 (FIG. 2).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
identifying a first subset of data within a first storage structure having a first access characteristic different than a second access characteristic of a second subset of the data within the first storage structure based upon an analysis of metadata of access operations to the data within the first storage structure;
selecting data items for inclusion within the second subset of the data based upon a cost benefit analysis of storing a threshold amount of data for parallel access compared to reducing storage space utilized to redundantly store data;
storing a copy of the second subset of the data within a second storage structure created to store the second subset of the data based upon the second subset of the data having the second access characteristic, wherein the first and second subsets of the data are retained within the first storage structure; and
providing access to the second subset of the data through the first and second storage structures and access to the first subset of the data through the first storage structure.

2. The method of claim 1, comprising:
providing clients with read access to the second subset of the data through the first storage structure and the second storage structure.

3. The method of claim 1, comprising:
processing a first access request to the second subset of the data using the first storage structure in parallel with processing a second access request to the second subset of the data using the second storage structure.

4. The method of claim 1, comprising:
creating a load sharing mirror, as the second storage structure, that has read-only access and can be accessed independently of the first storage structure.

5. The method of claim 1, comprising:
creating a database in a reserved area of the first storage structure for storing the metadata.

6. The method of claim 1, wherein the second storage structure has read-only access and the first storage structure supports read operations and write operations.

7. The method of claim 1, comprising:
creating a plurality of additional storage structures with independent access paths to allow parallel access thereto.

8. The method of claim 7, comprising:
storing copies of the second subset of the data within the plurality of additional storage structures.

9. The method of claim 1, comprising:
identifying data items for inclusion within the second subset of the data based upon the data items being access greater than a threshold frequency.

10. A computing device comprising:
a memory comprising instructions for performing a method; and
a processor coupled to the memory, the processor configured to execute the instructions to cause the processor to:
identify a first subset of data within a first storage structure having a first access characteristic different than a second access characteristic of a second subset of the data within the first storage structure based upon an analysis of metadata of access operations to the data within the first storage structure;
select data items for inclusion within the second subset of the data based upon a cost benefit analysis of storing a threshold amount of data for parallel access compared to reducing storage space utilized to redundantly store data;
store a copy of the second subset of the data within a second storage structure created to store the second subset of the data based upon the second subset of the data having the second access characteristic, wherein the first and second subsets of the data are retained within the first storage structure; and
provide access to the second subset of the data through the first and second storage structures and access to the first subset of the data through the first storage structure.

11. The computing device of claim 10, wherein the first storage structure comprises a logical volume.

12. The computing device of claim 10, wherein the second storage structure comprises a logical volume.

13. The computing device of claim 10, wherein the instructions cause the processor to update data within the second storage structure with changes to the second subset of the data that occurred at the first storage structure, wherein the updating is performed according to an updating policy.

14. The computing device of claim 10, wherein the metadata is stored within a database saved to a reserved space in the first storage structure.

15. The computing device of claim 10, wherein the instructions cause the processor to create an additional storage structure mirroring the second storage structure, wherein both the second storage structure and the additional storage structure comprise independent access paths.

16. A non-transitory computer readable medium comprising instructions, which when executed by a machine, causes the machine to:
identify a first subset of data within a first storage structure having a first access characteristic different than a second access characteristic of a second subset of the data within the first storage structure based upon an analysis of metadata of access operations to the data within the first storage structure;
select data items for inclusion within the second subset of the data based upon a cost benefit analysis of storing a threshold amount of data for parallel access compared to reducing storage space utilized to redundantly store data;
store a copy of the second subset of the data within a second storage structure created to store the second subset of the data based upon the second subset of the data having the second access characteristic, wherein the first and second subsets of the data are retained within the first storage structure; and
provide access to the second subset of the data through the first and second storage structures and access to the first subset of the data through the first storage structure.

17. The non-transitory computer readable medium of claim 16, wherein the instructions cause the machine to:
update data within the second storage structure according to an updating policy based upon a threshold number of changes occurring to the second subset of the data within the first storage structure.

18. The non-transitory computer readable medium of claim 16, wherein the first storage structure is a logical volume.

19. The non-transitory computer readable medium of claim 16, wherein the first storage structure provides read and write access and the second storage structure provides read-only access.

20. The non-transitory computer readable medium of claim 16, wherein the second storage structure is a logical volume.

* * * * *